United States Patent
Srinivasan (10) Patent No.: US 11,363,049 B1
(45) Date of Patent: Jun. 14, 2022

(54) INFORMATION SECURITY SYSTEM AND METHOD FOR ANOMALY DETECTION IN DATA TRANSMISSION

(71) Applicant: Bank of America Corporation, Charlotte, NC (US)

(72) Inventor: Sriram Srinivasan, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/211,947

(22) Filed: Mar. 25, 2021

(51) Int. Cl.
| | |
|---|---|
| *H04L 9/40* | (2022.01) |
| *G06F 21/60* | (2013.01) |
| *G06F 21/55* | (2013.01) |
| *G06F 21/64* | (2013.01) |
| *G06F 21/62* | (2013.01) |

(52) U.S. Cl.
CPC ........ *H04L 63/1425* (2013.01); *G06F 21/554* (2013.01); *G06F 21/606* (2013.01); *G06F 21/6209* (2013.01); *G06F 21/64* (2013.01); *H04L 63/20* (2013.01)

(58) Field of Classification Search
CPC .......... G06F 21/55–554; G06F 21/565; G06F 21/604; G06F 21/606; G06F 21/6209; G06F 21/6227; G06F 21/6236; G06F 21/6245; G06F 21/64; H04L 63/0428; H04L 63/1408; H04L 63/1425; H04L 63/20
See application file for complete search history.

(56) References Cited

U.S. PATENT DOCUMENTS

| | | | |
|---|---|---|---|
| 6,697,768 B2 | 2/2004 | Jones et al. |
| 6,947,857 B2 | 9/2005 | Jones et al. |
| 7,250,772 B2 | 7/2007 | Furse et al. |
| 7,784,099 B2 | 8/2010 | Benjamin |
| 7,979,368 B2 | 7/2011 | Kapoor et al. |
| 8,135,657 B2 | 3/2012 | Kapoor et al. |
| 8,159,945 B2 | 4/2012 | Muro et al. |
| 8,375,444 B2 | 2/2013 | Aziz et al. |

(Continued)

OTHER PUBLICATIONS

Srinivasan, S., "Information Security System and Method For Security Threat Detection in Data Transmission," U.S. Appl. No. 17/211,916, filed Mar. 25, 2021, 48 pages.

(Continued)

*Primary Examiner* — Kevin Bechtel (57) ABSTRACT

A system for anomaly detection in data transmission extracts data features from a data file. The system compares each data feature with a corresponding historical data feature associated with a historical transmission of the data file. The system determines whether the data feature deviates from the corresponding historical data feature. In response to determining that the data feature deviates from the corresponding historical data feature, the system determines that the data feature is associated with an anomaly. The system determines whether more than a threshold percentage of the data features are associated with anomalies. If it is determined that more than the threshold percentage of the data features are associated with anomalies, the system determines whether a transmission channel through which the data file is transmitted has failed. In response to determining that the transmission channel has failed, the system transmits the data file using another transmission channel.

20 Claims, 4 Drawing Sheets

(56) References Cited

U.S. PATENT DOCUMENTS

| | | |
|---|---|---|
| 8,402,540 B2 | 3/2013 | Kapoor et al. |
| 8,689,333 B2 | 4/2014 | Aziz |
| 8,838,525 B2 | 9/2014 | Christiaens et al. |
| 8,874,972 B2 | 10/2014 | Sampei et al. |
| 8,898,504 B2 | 11/2014 | Baumgartner et al. |
| 9,015,567 B2 | 4/2015 | Peach |
| 9,030,945 B2 | 5/2015 | Shao et al. |
| 9,041,530 B2 | 5/2015 | Sprigg et al. |
| 9,143,228 B2 | 9/2015 | Sandstrom |
| 9,231,964 B2 | 1/2016 | Cross et al. |
| 9,239,760 B2 | 1/2016 | Baone et al. |
| 9,276,950 B2 | 3/2016 | Stolfo et al. |
| 9,444,654 B2 | 9/2016 | Hormati et al. |
| 9,444,719 B2 | 9/2016 | Wolcott et al. |
| 9,525,696 B2 | 12/2016 | Kapoor et al. |
| 9,568,392 B2 | 2/2017 | Peleg et al. |
| 9,712,490 B1 | 7/2017 | Burns et al. |
| 9,800,608 B2 | 10/2017 | Korsunski et al. |
| 9,811,438 B1 | 11/2017 | Barrett et al. |
| 9,906,405 B2 | 2/2018 | Mankovskii |
| 9,935,772 B1 | 4/2018 | Madisetti et al. |
| 10,079,846 B2 | 9/2018 | Yadav et al. |
| 10,116,674 B2 | 10/2018 | Baradaran et al. |
| 10,142,164 B2 | 11/2018 | Ramachandran et al. |
| 10,154,053 B2 | 12/2018 | Yadav et al. |
| 10,210,470 B2 | 2/2019 | Ray |
| 10,230,747 B2 | 3/2019 | Kopp et al. |
| 10,282,963 B2 | 5/2019 | Fahey |
| 10,284,574 B1 | 5/2019 | Aziz et al. |
| 10,318,886 B2 | 6/2019 | Baradaran et al. |
| 10,389,738 B2 | 8/2019 | Muddu et al. |
| 10,419,458 B2 | 9/2019 | Moscovici et al. |
| 10,476,893 B2 | 11/2019 | Baradaran et al. |
| 10,609,751 B2 | 3/2020 | Lu et al. |
| 10,623,434 B1 | 4/2020 | Aziz et al. |
| 10,635,563 B2 | 4/2020 | Salunke et al. |
| 10,848,406 B2 | 11/2020 | Hobgood et al. |
| 10,856,836 B2 | 12/2020 | Hussain |
| 2010/0246432 A1 | 9/2010 | Zhang et al. |
| 2014/0236371 A1 | 8/2014 | Ishihara et al. |
| 2016/0359695 A1 | 12/2016 | Yadav et al. |
| 2017/0010932 A1 | 1/2017 | Inamura et al. |
| 2018/0248895 A1* | 8/2018 | Watson .............. G06Q 20/4016 |
| 2019/0220011 A1 | 7/2019 | Penna |
| 2019/0354709 A1* | 11/2019 | Brinskelle ............. H04L 63/166 |
| 2019/0387399 A1* | 12/2019 | Weinberg ............ H04L 63/1441 |
| 2020/0372081 A1* | 11/2020 | Bain ................... G06F 16/2358 |

OTHER PUBLICATIONS

Srinivasan, S., "Information Security System and Method for Incompliance Detection in Data Transmission," U.S. Appl. No. 17/212,050, filed Mar. 25, 2021, 49 pages.

* cited by examiner

INFORMATION SECURITY SYSTEM AND METHOD FOR ANOMALY DETECTION IN DATA TRANSMISSION

TECHNICAL FIELD

The present disclosure relates generally to information security, and more specifically to an information security system and method for anomaly detection in data.

BACKGROUND

It is challenging to monitor the status of data transmissions among various computer systems. In current approaches, data transmissions are inspected manually for security threats, anomalies, and incompliances. However, regularly monitoring a large number of data transmissions is error-prone. In some cases, a transmission of a data file may not be authorized. For example, a data file may be transmitted to an unauthorized person. In some cases, a data file may be transmitted without encryption making the data file vulnerable to unauthorized access. Current information security technologies are not configured to provide a reliable and efficient solution for security threat, anomaly, and incompliance detection in data transmissions.

SUMMARY

Current information security technologies are not configured to provide a reliable and efficient solution for security threat, anomaly, and incompliance detection in data transmission. This disclosure contemplates systems and methods for security threat, anomaly, and incompliance detection in data transmission.

To this end, the disclosed system extracts a set of data features from a data file that is scheduled to be transmitted. For example, the set of data features may include a size, a transmission timestamp, a sender's credential, a receipt timestamp, a receiver's credential, a data structure, an acknowledgment indication, and a security feature associated with the data file. For each data feature, the disclosed system compares the data feature with a corresponding historical data feature from a set of historical data features associated with the data file historically transmitted. The disclosed system determines whether the data feature deviates from its corresponding historical data feature.

With respect to security threat detection in data transmission, the disclosed system may determine that the data file is associated with a security threat in cases where 1) an unauthorized person sends a data file (i.e., unauthorized transmission), in response to determining that the sender's credential deviates from credentials of senders of the data file in historical transmissions of the data file; 2) the data file is sent to an unauthorized person (i.e., unauthorized transmission), in response to determining that the receivers' credential deviates from credentials of receivers of the data file in historical transmissions of the data file; 3) a data file is transmitted (or scheduled to be transmitted) in an irregular time (compared to historical transmissions of the data file), in response to determining that the transmission timestamp deviates from timestamps in historical transmissions of the data file; and 4) no security feature (e.g., an encryption function) is used for encrypting the data file (i.e., unsecured transmission), or the current security feature deviates from security features used in historical transmissions of the data file. In response to detecting any of these cases, the system may terminate the transmission of the data file.

With respect to security threat detection in data transmission, in one embodiment, a system for security threat detection in data transmission comprises a memory and a processor. The memory is operable to store a plurality of data files being communicated between a first computing device and a second computing device. The processor is operably coupled with the memory. The processor fetches the plurality of data files from the memory. For each data file from the plurality of data files, the processor extracts a set of data features from the data file. The set of data features includes at least one of a transmission timestamp, a receipt timestamp, credentials of a sender of the data file, credentials of a receiver of the data file, and a security mechanism used in the data file. For at least one of the data features, the processor compares the data feature with a corresponding historical data feature from a set of historical data features associated with the data file. The set of historical data features corresponds to data features associated with data files that were historically communicated between the first computing device and the second computing device. The processor determines whether the data feature deviates from the corresponding historical data feature. In response to determining that the data feature deviates from the corresponding historical data feature, the processor determines that the data feature is associated with a security threat that makes the data file vulnerable to unauthorized access. The processor determines whether more than a threshold percentage of the set of data features are associated with security threats. In response to determining that more than the threshold percentage of the set of data features are associated with the security threats, the processor terminates transmitting the data file from the first computing device to the second computing device.

With respect to anomaly detection in data transmission, the disclosed system may determine that the data file is associated with an anomaly in cases where 1) the data file transmission is not processed (e.g., the disclosed system did not receive an acknowledgment from a receiver of the data file), in response to determining that the acknowledgment indication deviates from historical acknowledgment indications of the historical transmissions of the data file; and 2) a transmission channel that communicates the data file is sending an empty data file (e.g., the size of the data file is zero or does not correspond to historical sizes of the data file in historical transmissions), in response to determining that the size of data file deviates from sizes of the data file in historical transmissions of the data file. In response to detecting any of these cases, in one embodiment, the disclosed system determines whether the transmission channel has failed due to a failure in a server that is tasked to establish the transmission channel. If the disclosed system determines that the transmission channel has failed due to server failure, the disclosed system establishes a second transmission channel using another server for transmitting the data file.

With respect to anomaly detection in data transmission, in one embodiment, a system for anomaly detection in data transmission comprises a memory and a processor. The memory is operable to store a plurality of data files being communicated between a first computing device and a second computing device. The processor is operably coupled with the memory. The processor fetches the plurality of data files from the memory. For each data file from the plurality of data files, the processor extracts a set of data features from the data file. The set of data features comprises at least one of a size of the data file and an acknowledgment of a receipt of the data file. For at least one of the data features, the processor compares the data feature with a corresponding historical data feature from a set of historical data features associated with the data file. The set of historical data features corresponds to data features associated with data files that were historically communicated between the first computing device and the second computing device. The processor determines whether the data feature deviates from the corresponding historical data feature. In response to determining that the data feature deviates from the corresponding historical data feature, the processor determines that the data feature is associated with an anomaly indicating that a transmission of the data file is not processed, where determining that the data feature is associated with the anomaly comprises at least one of determining that the size of the data file is not within a threshold range of a historical size of the data file indicated in the set of historical data files, and determining that the acknowledgment of the receipt of the data file is not received. The processor determines whether more than a threshold percentage of the set of data features are associated with anomalies. In response to determining that more than the threshold percentage of the set of data features are associated with the anomalies, the processor determines whether the anomalies are due to a failure in a transmission channel through which the data file is transmitted from the first computing device to the second computing device. In response to determining that the anomalies are due to the failure in the transmission channel, the processor terminates the transmission channel.

With respect to incompliance detection in data transmission, the disclosed system may determine that the data file does not comply with historical transmissions of the data file, (i.e., the data file is incompliant) in cases where the data structure or data format of the data file deviates from a data structure of the data file historically transmitted. In response to detecting these cases, the system may update (or revise) the data file according to the historical data structure associated with the data file historically transmitted, such that the updated data file has an updated data structure that corresponds to the historical data structure of the data file historically transmitted.

With respect to incompliance detection in data transmission, in one embodiment, a system for incompliance detection in data transmission comprises a memory and a processor. The memory is operable to store a plurality of data files being communicated between a first computing device and a second computing device. The processor is operably coupled with the memory. The processor fetches the plurality of data files from the memory. For each data file from the plurality of data files, the processor extracts a set of data features from the data file. The set of data features comprises a data structure of the data file. For at least one of the data features, the processor compares the data feature with a corresponding historical data feature from a set of historical data features associated with the data file. The set of historical data features corresponds to data features associated with data files that were historically communicated between the first computing device and the second computing device. The processor determines whether the data feature deviates from the corresponding historical data feature. In response to determining that the data feature deviates from the corresponding historical data feature, the processor determines that the data feature does comply with the corresponding historical data feature. The processor determines whether more than a threshold percentage of the set of data features deviate from corresponding historical data features. In response to determining that more than the threshold percentage of the set of data features deviate from the corresponding historical data features, the processor sends a notification to update the data by updating the data structure, such that the updated data structure corresponds to a historical data structure of the data file indicated in the set of historical data features.

The disclosed system provides several practical applications and technical advantages which include: 1) technology that detects security threats in data transmission, if it is determined that an unauthorized person sends a data file, the data file is sent to an unauthorized person, a data file is transmitted (or scheduled to be transmitted) in an irregular time (compared to historical transmissions of the data file), and/or no security feature is used for encrypting the data file; 2) technology that terminates the data file transmission, in response to detecting a security threat in a data file transmission; 3) technology that detects anomalies in data transmission, if it is determined that the data file transmission is not processed (e.g., the disclosed system did not receive an acknowledgment from a receiver of the data file) and/or a transmission channel that communicates the data file is sending an empty data file (e.g., the size of the data file is zero or does not correspond to historical data file transmissions); 4) technology that determines whether the transmission channel has failed due to a failure in a server tasked to establish the transmission channel, in response to detecting that an anomaly in data transmission; 5) technology that detects incompliance in data transmission, if it is determined that a data structure of a data file deviates from a historical data structure associated with data file historically transmitted; and 6) technology that updates the data file, in response to detecting an incompliance in data transmission.

As such, the disclosed system may improve the current information security technologies by detecting security threats, anomalies, and/or incompliances in data transmission. Accordingly, the disclosed system may be integrated into a practical application of improving data transmission and communication. For example, by proactively detecting security threats, anomalies, and/or incompliances before transmitting a data file, the transmission of the data file may be terminated, a transmission channel and/or server failure may be detected, and/or the data file may be updated.

The disclosed system may be integrated into an additional practical application of securing data files from unauthorized access, for example, by detecting whether a sender of a data file is authorized to send the data file and whether a receiver of a data is authorized to receive the data file.

This, in turn, provides an additional practical application of securing computer systems that are tasked to store the data files. By securing the data files from unauthorized access, the computer systems that store the data files are kept secure from unauthorized access as well.

This, in turn, provides an additional practical application of improving underlying operations of the computer systems tasked to store the data files. For example, the disclosed system may decrease processing, memory, and time resources spent in data transmission that would otherwise be spent using the current information security and data transmission technologies.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description.

DETAILED DESCRIPTION

As described above, previous technologies fail to provide efficient, reliable, and safe solutions for security threat, anomaly, and incompliance detection in data transmission. This disclosure provides various systems and methods for security threat, anomaly, and incompliance detection in data transmission. In one embodiment, a system 100 and method 200 for security threat detection in data transmission are described in FIGS. 1 and 2, respectively. In one embodiment, system 100 and method 300 for anomaly detection in data transmission are described in FIGS. 1 and 3, respectively. In one embodiment, system 100 and method 400 for incompliance detection in data transmission are described in FIGS. 1 and 4, respectively.

Figure 1:
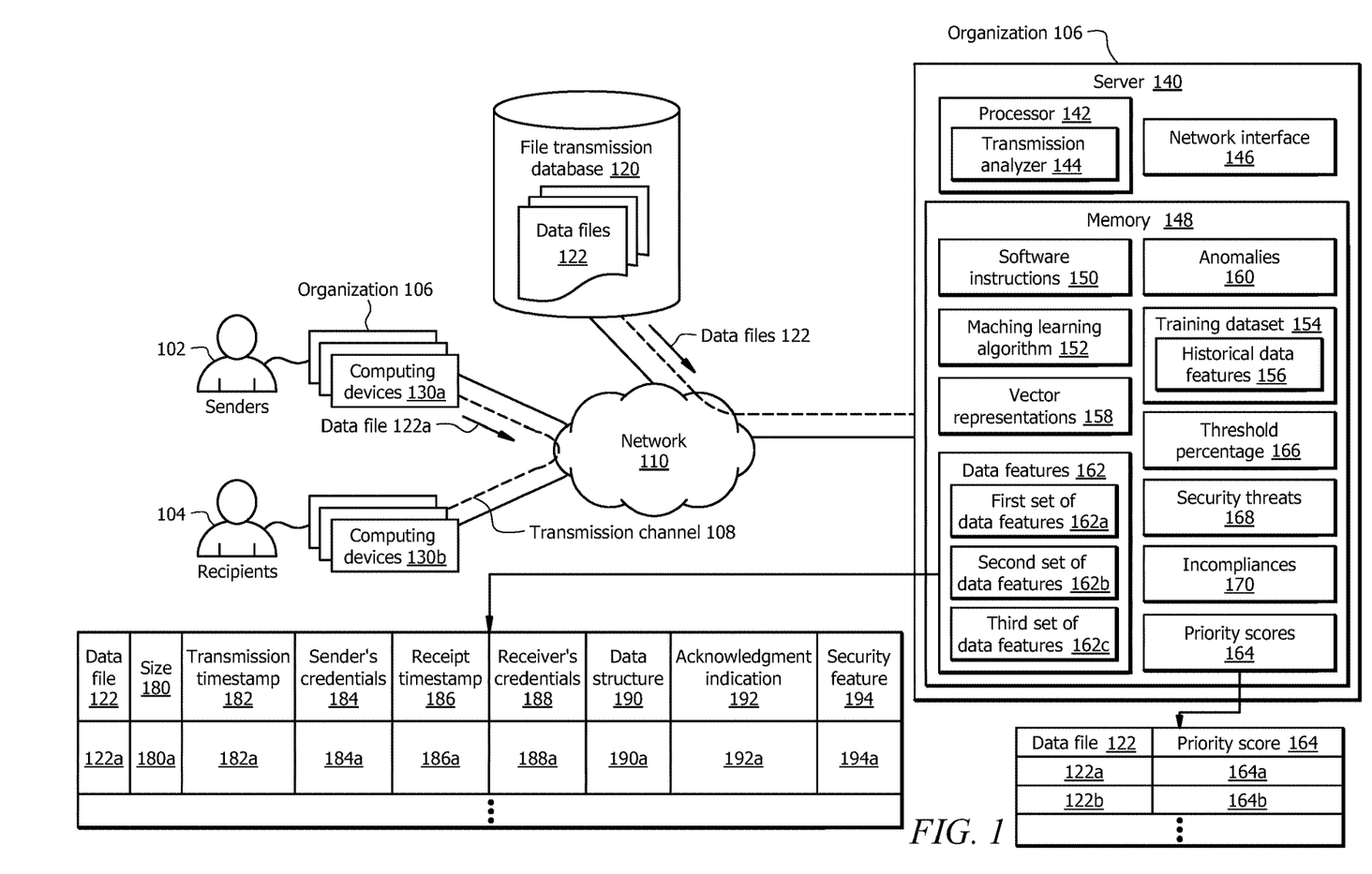
FIG. 1 illustrates an embodiment of a system configured for security threat, anomaly, and incompliance detection in data transmission.

Example System for Security Threat, Anomaly, and Incompliance Detection in Data Transmission FIG. 1 illustrates one embodiment of a system 100 that is configured for detecting anomalies 160, security threats 168, and incompliances 170 in the transmission of data files 122 from a first computing device 130a to a second computing device 130b. In one embodiment, system 100 comprises a server 140. In some embodiments, system 100 further comprises a network 110, a file transmission database 120, and one or more computing devices 130 (e.g., computing devices 130a and 130b). Network 110 enables communications between components of the system 100. Server 140 comprises a processor 142 in signal communication of a memory 148. Memory 148 stores software instructions 150 that when executed by the processor 142 cause the processor 142 to perform one or more functions described herein. For example, when the software instructions 150 are executed, the processor executes a transmission analyzer 144 to analyze a data file 122 that is scheduled to be transmitted to a recipient 104, detect anomalies 160, security threats 168, and/or incompliances 170 in the transmission of data file 122, and in response, perform specific actions to address the anomalies 160, security threats 168, and/or incompliances 170 as described below. The file transmission database 120 stores data files 122 that provide information that may be used by the software instructions 150 and/or the processor 142. In other embodiments, system 100 may not have all of the components listed and/or may have other elements instead of, or in addition to, those listed above.

In general, system 100 (via the transmission analyzer 144) fetches a plurality of data files 122 from the file transmission database 120. The transmission analyzer 144 may perform one or more following operations for each data file 122. The transmission analyzer 144 extracts a set of data features 162 from the data file 122. The set of data features 162 may include, but are not limited to, a size 180, a transmission timestamp 182, a sender's credential 184, a receipt timestamp 186, a receiver's credential 188, a data structure 190, an acknowledgment indication 192, and a security feature 194 associated with the data file 122. For at least one data feature 162 from the set of data features 162, the transmission analyzer 144 may perform the following operations. The transmission analyzer 144 compares the data feature 162 with a corresponding historical data feature 156 associated with the data file 122. For example, assuming that the data feature 162 is the transmission timestamp 182 associated with the data file 122, the transmission analyzer 144 compares the transmission timestamp 182 associated with the data file 122 with historical transmission timestamps 182 when the data file 122 was previously transmitted. The transmission analyzer 144 determines whether the data feature 162 deviates from the corresponding historical data feature 156.

In response to determining that at least one data feature 162 from a first set of data features 162a deviates from its corresponding historical data feature 156, the transmission analyzer 144 determines that the data feature 162 is associated with a security threat 168. The first set of data features 162a may include the transmission timestamp 182, sender's credentials 184, receipt timestamp 186, receiver's credentials 188, and security feature 194 associated with the data file 122. Thus, for example, in response to determining that at least one of the transmission timestamp 182, sender's credentials 184, receipt timestamp 186, receiver's credentials 188, and security feature 194 associated with the data file 122 deviates from its corresponding historical data feature 156, the transmission analyzer 144 determines that the data features 162 is associated with a security threat 168. The transmission analyzer 144 determines whether more than a threshold percentage 166 (e.g., 80%, 90%, etc.) of the set of data features 162 are associated with security threats 168. In response to determining that more than the threshold percentage 166 of the set of data features 162 are associated with security threats 168, the transmission analyzer 144 terminates the transmission of the data file 122.

In response to determining that at least one data feature 162 from a second set of data features 162b deviates from its corresponding historical data feature 156, the transmission analyzer 144 determines that the data feature 162 is associated with an anomaly 160. The second set of data features 162b may include the size 180 and acknowledgment indication 192 associated with the data file 122. Thus, for example, in response to determining that at least one of the size 180 and acknowledgment indication 192 associated with the data file 122 deviates from its corresponding historical data feature 156, the transmission analyzer 144 determines that the data features 162 is associated with an anomaly 160. The transmission analyzer 144 determines whether more than a threshold percentage 166 of the set of data features 162 are associated with anomalies 160. In response to determining that more than the threshold percentage 166 of the set of data features 162 are associated with anomalies 160, the transmission analyzer 144 determines whether the anomalies 160 are due to a failure in a transmission channel 108 through which the data file 122 is being transmitted. If the transmission analyzer 144 determines that the anomalies 160 are due to a failure in the transmission channel 108, the transmission analyzer 144 uses a second transmission channel 108 for transmitting the data file 122.

In response to determining that at least one data feature 162 from a third set of data features 162c deviates from its corresponding historical data feature 156, the transmission analyzer 144 determines that the data feature 162 does not comply with the historical data feature 156, i.e., the data feature 162 is associated with an incompliance 170. The second set of data features 162b may include the data structure 190 associated with the data file 122. Thus, for example, in response to determining that the data structure 190 associated with the data file 122 deviates from its corresponding historical data feature 156, the transmission analyzer 144 determines that the data file 122 does not comply with historical data files 122 historically transmitted (i.e., transmission analyzer 144 detects an incompliance 170 in transmission of the data file 122). In response, the transmission analyzer 144 updates the data file 122 by updating the data structure 190 of the data file 122 according to the historical data structures 190 of the data file 122 historically transmitted, such that the updated data structure 190 corresponds to the historical data structures 190 of the data file 122 historically transmitted.

System Components

Network 110 may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 110 may be configured to support any suitable type of communication protocol as would be appreciated by one of ordinary skill in the art.

File transmission database 120 generally comprises any storage architecture. Examples of the user profile database 112 include, but are not limited to, a network-attached storage cloud, a storage area network, a storage assembly directly (or indirectly) coupled to one or more components of the system 100. The file transmission database 120 stores data files 122 that are scheduled to be transmitted to their corresponding recipients 104 and data files 122 that are already transmitted to their corresponding recipients 104. A data file 122 may generally be any file or message, including an email message and a text message, or any file that can be transmitted from a first computing device 130a to a second computing device 130b through the network 110.

Each computing device 130, such as computing devices 130a and 130b, is generally any device that is configured to process data and interact with users, such as senders 102 and recipients 104. Examples of computing device 130 include, but are not limited to, a personal computer, a desktop computer, a workstation, a server, a laptop, a tablet computer, a mobile phone (such as a smartphone), etc. A sender 102 may send a data file 122 (e.g., data file 122a) from the first computing device 130a to the second computing device 130b to be accessed by a recipient 104. The computing device 130a and/or computing device 130b may be associated with an organization 106. Thus, the computing device 130b may be associated with an external or internal entity with respect to the organization 106.

Server

Server 140 is generally a server or any other device configured to process data and communicate with computing devices (e.g., computing devices 130), and databases (e.g., file transmission database 120), systems, domains, etc. via the network 110. In one example, server 140 may be a backend server associated with organization 106, and is generally configured to oversee operations of the processor 142 as described further below. For example, the server 140 is configured to oversee operations of the transmission analyzer 144 described further below.

Processor 142 comprises one or more processors operably coupled to the memory 148. The processor 142 is any electronic circuitry including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 142 may be a programmable logic device, a microcontroller, a microprocessor, or any suitable combination of the preceding. The one or more processors are configured to process data and may be implemented in hardware or software. For example, the processor 142 may be 8-bit, 16-bit, 32-bit, 64-bit, or of any other suitable architecture. The processor 142 may include an arithmetic logic unit (ALU) for performing arithmetic and logic operations, processor 142 registers the supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions (e.g., software instructions 150) to implement the transmission analyzer 144. In this way, processor 142 may be a special-purpose computer designed to implement the functions disclosed herein. In an embodiment, the processor 142 is implemented using logic units, FPGAs, ASICs, DSPs, or any other suitable hardware. The processor 142 is configured to operate as described in FIGS. 1-4. For example, the processor 142 may be configured to perform one or more steps of methods 200, 300, and 400 as described in FIGS. 2, 3, and 4, respectively.

Network interface 146 is configured to enable wired and/or wireless communications (e.g., via network 110). The network interface 146 is configured to communicate data between the server 140 and other devices (e.g., computing devices 130), databases (e.g., file transmission database 120), systems, and domains. For example, the network interface 146 may comprise a WIFI interface, a local area network (LAN) interface, a wide area network (WAN) interface, a modem, a switch, or a router. The processor 142 is configured to send and receive data using the network interface 146. The network interface 146 may be configured to use any suitable type of communication protocol as would be appreciated by one of ordinary skill in the art.

Memory 148 may be volatile or non-volatile and may comprise a read-only memory (ROM), random-access memory (RAM), ternary content-addressable memory (TCAM), dynamic random-access memory (DRAM), and static random-access memory (SRAM). Memory 148 may be implemented using one or more disks, tape drives, solid-state drives, and/or the like. Memory 148 is operable to store the software instructions 150, machine learning algorithm 152, training dataset 154, vector representations 158, anomalies 160, data features 162, priority scores 164, threshold percentage 166, security threats 168, incompliances 170, and/or any other data or instructions. The software instructions 150 may comprise any suitable set of instructions, logic, rules, or code operable to execute the processor 142.

Transmission Analyzer

Transmission analyzer 144 may be implemented by the processor 142 executing software instructions 150, and is generally configured to analyze a data file 122, extract data features 162 from the data file 122, compare each data feature 162 with its corresponding historical data feature 156, based on the comparison, determine whether the data file 122 is associated with 1) an anomaly 160, 2) security threat 168, and/or 3) incompliance 170, and in each case, perform a specific action as described further below in conjunction with an operational flow of system 100. The operations of the transmission analyzer 144 are described in FIGS. 2-4 in more detail. The first operation of the transmission analyzer 144 with respect to security threat detection in data transmission is described in FIG. 2. The second operation of the transmission analyzer 144 with respect to anomaly detection in data transmission is described in FIG. 3. The third operation of the transmission analyzer 144 with respect to incompliance detection in data transmission is described in FIG. 4.

In one embodiment, the transmission analyzer 144 may be implemented using a machine learning algorithm 152, such as support vector machine, neural network, random forest, k-means clustering, etc. For example, the machine learning algorithm 152 may be implemented by a plurality of neural network (NN) layers, Convolutional NN (CNN) layers, Long-Short-Term-Memory (LSTM) layers, Bi-directional LSTM layers, Recurrent NN (RNN) layers, and the like. In another example, the machine learning algorithm 152 may be implemented by a Natural Language Processing (NLP). Thus, the transmission analyzer 144, using the machine learning algorithm 152, may be configured to extract data features 162 from a data file 122 by parsing the data file 122. In this operation, the transmission analyzer 144 feeds the data file 122 to the machine learning algorithm 152 to extract the data features 162 from the data file 122. The output of this operation is a vector representation 158 comprising numerical values representing the data features 162 associated with the data file 122. For example, a first numerical value in the vector representation 158 may represent a size 180 of the data file 122, a second numerical value in the vector representation 158 may represent a transmission timestamp 182 when the data file 122 is transmitted to a respective recipient 104, and so on.

The set of data features 162 may include, but are not limited to, a size 180, a transmission timestamp 182, a sender's credential 184, a receipt timestamp 186, a receiver's credential 188, a data structure 190, an acknowledgment indication 192, and a security feature 194 associated with the data file 122. The size 180 represents the size of the data file 122, e.g., in bytes. The transmission timestamp 182 represents the time when the data file 122 is transmitted or scheduled to be transmitted. The sender's credential 184 may represent login credentials associated with the sender 102. The receipt timestamp 186 represents the time when the data file 122 is received at its destination, e.g., the computing device 130b. For example, when the data file 122 is received at its destination, a notification message may be sent to a computing device 130a from which the data file 122 was originated. The receiver's credential 188 may represent login credentials associated with the receiver 104 of the data file 122. The data structure 190 may represent a format or layout of the data file 122. For example, assume that the data file 122a includes a report of customer account numbers that each is a 14-digit number. As such the data structure 190 of the data file 122a is 14-digit numbers. In another example, assume that that the data file 122b includes a report of account balances that vary between one to ten-digit numbers. As such, the data structure 190 of the data file 122b includes numbers between one to ten digits.

In some embodiments, the transmission analyzer 144 may be implemented by a supervised, semi-supervised, and/or unsupervised machine learning algorithm 152. For example, to determine whether a data file 122 is associated with an anomaly 160, the transmission analyzer 144 may be trained by a training dataset 154. The training dataset 154 may include historical data features 156 associated with data files 122 historically transmitted to their corresponding recipients 104. The transmission analyzer 144 may extract the historical data features 156 from data files 122 historically transmitted using the machine learning algorithm 152, similar to that described above. For example, with respect to the first data file 122a, to determine whether the first data file 122a is associated with an anomaly 160, the transmission analyzer 144 may compare one or more data features 162 associated with the first data file 122a with one or more corresponding historical data features 156 associated with the first data file 122a. For example, the transmission analyzer 144 may compare a first data feature 162 that represents a security feature 198 (e.g., an encryption function) used for encrypting the first data file 122a with a first historical data feature 156 that represents a security feature 198 used for encrypting the first data file 122a that was historically transmitted. Similarly, the transmission analyzer 144 may compare other data features 162 with their corresponding historical data features 156 associated with the first data file 122a provided in the training dataset 154. As such, the transmission analyzer 144 may use the historical data features 156 extracted from data files 122a historically transmitted to determine whether the current data file 122a is associated with an anomaly 160 and security threats. This process is described in more detail further below in conjunction with the operational flow of system 100.

Operational Flow

Extracting Data Features from a Data File

The operational flow of system 100 begins when the transmission analyzer 144 fetches a data file 122 from the file transmission database 120, and processes the data file 122 to extract data features 162 from the data file 122. The transmission analyzer 144 extracts the data features 162 from the data file 122 by using the machine learning algorithm 152 and generating a vector representation 158 comprising numerical values representing the data features 162, similar to that described above. The transmission analyzer 144 may perform the following operations for one or more of the data features 162.

Comparing a Data Feature with a Corresponding Historical Data Feature

The transmission analyzer 144 compares a data feature 162 with its corresponding historical data feature 156 by implementing the machine learning algorithm 152, similar to that described above. In this operation, the transmission analyzer 144 determines a first numerical value from a first vector representation 158 representing a first data feature 162, e.g., the current security feature 198 used for encrypting the data file 122. The transmission analyzer 144 also determines a second numerical value from a second vector representation 158 representing a corresponding historical data feature 156, e.g., a historical security feature 198 used for encrypting the data file 122 historically transmitted.

The transmission analyzer 144 determines whether the first numerical value (e.g., representing the current security feature 198 used in the data file 122) is within a threshold percentage range (e.g., ±5%, ±10%, etc.) of the second numerical value (e.g., representing the historical security feature 198 used in the data file 122 historically transmitted). If the transmission analyzer 144 determines that the first numerical value is not within the threshold percentage range of the second numerical value, the transmission analyzer 144 determines that the first data feature 162 that represents the current security feature 198 used in the data file 122 deviates from its corresponding historical data feature 156. The transmission analyzer 144 may perform a similar operation for other data features 162.

Determining Whether a Data Feature is Associated with a Security Threat

In one embodiment, the transmission analyzer 144 may compare a first set of data features 162a with their corresponding historical data features 156 to determine whether at least one data feature 162 from the first set of data features 162a is associated with a security threat 168 or security vulnerability that makes the data file 122 vulnerable to unauthorized access. The first set of data features 162a may include the transmission timestamp 182, sender's credentials 184, receipt timestamp 186, receiver's credentials 188, and security feature 194 associated with the data file 122.

The security threat 168 may correspond to 1) an unauthorized transmission of a data file 122, e.g., when the sender 102 is not authorized to send the data file 122 according to their sender's credential 184, 2) an unauthorized transmission of a data file 122, e.g., when the recipient 104 is not authorized to receive the data file 122 according to their receiver's credential 188, 3) the transmission of the data file 122 is in an unsecured mode, e.g., when no security feature 194 is used for encrypting the data file 122a, 4) the data structure 190 used in the data file 122 differs from historical data structures 190 used in previous transmissions of the data file 122, among others.

With respect to the transmission timestamp 182a, the transmission analyzer 144 compares the current transmission timestamp 182a with historical transmission timestamps 182a when the data files 122a historically transmitted. If the transmission analyzer 144 determines that the current transmission timestamp 182a does not correspond to (or is not within a threshold range of) the historical transmission timestamps 182a, the transmission analyzer 144 determines that the current transmission timestamp 182a is associated with a security threat 168. For example, assume that the current transmission timestamp 182a indicates that the data file 122a is transmitted (or scheduled to be transmitted) at a particular time of a particular day, e.g., 10 am on Friday. Also, assume that the historical transmission timestamps 182a indicate the data file 122a historically used to be transmitted at 2 pm on Tuesdays. In this example, the transmission analyzer 144 determines that the current transmission timestamp 182 deviates from the historical transmission timestamps 182a. In other words, the transmission analyzer 144 determines that the data file 122a is transmitted (or scheduled to be transmitted) at an irregular time compared to the historical transmission timestamps 182a, and thus, it is associated with a security threat 168.

With respect to the sender's credential 184a, the transmission analyzer 144 compares the current sender's credential 184a who has requested to transmit the data file 122a with historical senders' credentials 184a who previously transmitted the data file 122a. If the transmission analyzer 144 determines that the current sender's credential 184a does not correspond to the historical sender's credential 184a, the transmission analyzer 144 determines that the current sender's credential 184a is associated with a security threat 168, the current sender 102 may not be authorized to transmit the data file 122a, and that the transmission of the data file 122a is an unauthorized transmission.

With respect to the receipt timestamp 186a, the transmission analyzer 144 compares the current receipt timestamp 186a with historical receipt timestamps 186a when the data files 122a historically received to their corresponding recipients 104. If the transmission analyzer 144 determines that the current receipt timestamp 186a does not correspond (or is not within a threshold range) of the historical receipt timestamps 186a, the transmission analyzer 144 determines that the current receipt timestamp 186a is associated with a security threat 168.

With respect to the receiver's credential 188a, the transmission analyzer 144 compares the current receiver's credential 188a with the historical receiver's credential 188a who previously received the data file 122a. If the transmission analyzer 144 determines that the current receiver's credential 188a does not correspond to the historical receiver's credential 188a, the transmission analyzer 144 determines that the current receiver's credential 188a is associated with a security threat 168, the current recipient 104 may not be authorized to receive the data file 122a, and that the transmission of the data file 122a is an unauthorized transmission.

With respect to the security feature 194a, the transmission analyzer 144 compares the current security feature 194a used for encrypting the current data file 122a with the historical security feature 194a used in previous transmissions of the data file 122a. If the transmission analyzer 144 determines that the current security feature 194a does not correspond with the historical security feature 194a, the transmission analyzer 144 determines that the current security feature 194a is associated with an anomaly 160. For example, assume that the historical security feature 194a is a particular encryption function. Also, assume that no security feature 194a is used for encrypting the current data file 122a. Thus, in this example, the transmission analyzer 144 determines that the current security feature 194a is associated with an anomaly 160, and that the transmission of the current data file 122a is unsecured.

In one embodiment, the transmission analyzer 144 may determine whether more than a threshold percentage 166 of the data features 162 are associated with security threats 168. In response to determining that more than the threshold percentage 166 of the data features 162 are associated with security threats 168, the transmission analyzer 144 may terminate the transmission of the data file 122.

In another embodiment, the transmission analyzer 144 may send an applicable notification, for example, to an operator and/or the sender 102 of the data file 122a, indicating that the more than a threshold percentage 166 of the data features 162 are associated with security threats 168 and to terminate the transmission of the data file 122. The operator and/or the sender of the data file 122a may confirm, revise, or override termination of the transmission of the data file 122 determined by the transmission analyzer 144 by reviewing the data file 122a and its data features 162. The transmission analyzer 144 may add the feedback of the operator and/or sender 102 to the training dataset 154 to learn associations and relationships between each data transmission and the action taken by the operator and/or the sender 102.

Determining Whether a Data Feature is Associated with an Anomaly

In one embodiment, the transmission analyzer 144 may compare a second set of data features 162b with their corresponding historical data features 156 to determine whether data feature 162 from the second set of data features 162b is associated with an anomaly 160. The second set of data features 162b may include the size 180 and acknowledgment indication 192 associated with the data file 122.

With respect to the size 180a of the data file 122a, the transmission analyzer 144 may compare the current size 180a of the data file 122a with a historical size 180a (or a range of historical sizes 180a) of the data files 122a that were historically transmitted. If the transmission analyzer 144 determines that the current size 180a of the data file 122a is not within a threshold percentage of the historical size 180a (or the range of historical sizes 180a) of the data file 122a, the transmission analyzer 144 determines that the current size 180a of the data file 122a is associated with an anomaly 160.

With respect to the acknowledgment indication 192a, the transmission analyzer 144 compares the current acknowledgment indication 192a with the historical acknowledgment indication 192a. If the transmission analyzer 144 determines that the current acknowledgment indication 192a does not correspond to the historical acknowledgment indication 192a, the transmission analyzer 144 determines that the current acknowledgment indication 192a is associated with an anomaly 160. For example, assume that the current acknowledgment indication 192a indicates that the recipient 104 has not sent an acknowledgment message that the current data file 122a is received. Also, assume that the historical acknowledgment indication 192a indicates that the recipient 104 has sent an acknowledgment message in previous transmissions of the data file 122a. In this example, the transmission analyzer 144 determines that the current acknowledgment indication 192a is associated with an anomaly 160.

In one embodiment, the transmission analyzer 144 may determine whether more than a threshold percentage 166 of the data features 162 are associated with anomalies 160. In response to determining that more than the threshold percentage 166 of the data features 162 are associated with anomalies 160, the transmission analyzer 144 may determine whether the anomalies 160 are due to a failure in a transmission channel 108 used for transmitting the data file 122 from the first computing device 130a to the second computing device 130b.

The transmission analyzer 144 may determine that the anomalies 160 are due to a failure in the transmission channel 108 by determining whether a first server that is tasked to establish the transmission channel 108 failed to establish the transmission channel 108. In response to determining that the first server failed to establish the transmission channel 108, the transmission analyzer 144 establish a second transmission channel 108 for transmitting the data file 122 from the first computing device 130a to the second computing device 130b by using a second server.

In another embodiment, the transmission analyzer 144 may send an applicable notification, for example, to an operator and/or the sender 102 of the data file 122a, indicating that the more than the threshold percentage 166 of the data features 162 are associated with anomalies 160, and the anomalies 160 are due to a failure in the transmission channel 108. The operator and/or the sender of the data file 122a may confirm, revise, or override the determination of the transmission analyzer 144 by reviewing the data file 122a and its data features 162. The transmission analyzer 144 may add the feedback of the operator and/or sender 102 to the training dataset 154 to learn associations and relationships between each data transmission and the action taken by the operator and/or the sender 102.

Determining Whether a Data Feature is Associated with Incompliance

In one embodiment, the transmission analyzer 144 may compare a third set of data features 162c with their corresponding historical data features 156 to determine whether data feature 162 from the third set of data features 162c is associated with an incompliance 170. The third set of data features 162c may include the data structure 190 associated with the data file 122.

With respect to the data structure 190a associated with the data file 122a, the transmission analyzer 144 compares the current data structure 190a with historical data structures 190a associated with the data file 122a previously transmitted. If the transmission analyzer 144 determines that the current data structure 190a does not correspond to or comply with the historical data structures 190a, the transmission analyzer 144 determines that the current data structure 190a does not comply with the historical data structures 190a, i.e., the current data structure 190a is associated with an incompliance 170. For example, assume that the current data file 122a comprises a report of customer accounts that each is a 15-digit number (i.e., the current data structure 190a associated with the current data file 122a). Also, assume that the historical data structures 190a indicates that the data file 122a used to include a report of customer accounts that each was a 14-digit number (i.e., the historical data structure 190a). Thus, in this example, the transmission analyzer 144 determines that the current data structure 190a is associated with an incompliance 170.

In one embodiment, in response to determining that the data structure 190a is associated with the incompliance 170, the transmission analyzer 144 may update the data file 122a by updating the data structure 190a according to the historical data structures 190 of the data file 122a historically transmitted, such that the updated data structure 190a corresponds to the historical data structures 190 of the data file 122 historically transmitted.

In another embodiment, the transmission analyzer 144 may send an applicable notification, for example, to an operator and/or the sender 102 of the data file 122a, indicating that the data structure 190 of the data file 122a does not comply with historical data structures 190a, and to update the data file 122a according to the historical data structures 190 of the data file 122a historically transmitted. The operator and/or the sender of the data file 122a may confirm, revise, or override the determination of the transmission analyzer 144 by reviewing the data file 122a and its data features 162. The transmission analyzer 144 may add the feedback of the operator and/or sender 102 to the training dataset 154 to learn associations and relationships between each data transmission and the action taken by the operator and/or the sender 102.

Therefore, the transmission analyzer 144 may use different approaches in addressing the transmissions of the data files 122 described above as feedback for further training the machine learning algorithm 152. As such, the transmission analyzer 144 may investigate transmissions of the data files 122 with a minimum (or without) human intervention.

Assigning Priority Scores to Data Files

The transmission analyzer 144 may assign a priority score 164 to each data file 122, where a priority score 164 associated with a particular data file 122 indicates a priority for inspecting the particular data file 122 before other data files 122. For example, if the transmission analyzer 144 determines that more than the threshold percentage 166 of data features 162 associated with a first data file 122a are associated with anomalies 160, security threats 168, and/or incompliances 170, the transmission analyzer 144 may assign a high priority score 164a to the first data file 122a. In another example, if the transmission analyzer 144 determines that less than the threshold percentage 166 of data features 162 associated with a second data file 122b are associated with anomalies 160, security threats 168, and/or incompliances 170, the transmission analyzer 144 may assign a low priority score 164b to the second data file 122b. The transmission analyzer 144 may rank the data files 122 according to their priority scores 164, such that data files 122 that are assigned with high priority scores 164 are addressed and inspected before other data files 122.

Example Method for Security Threat Detection in Data Transmission

Figure 2:
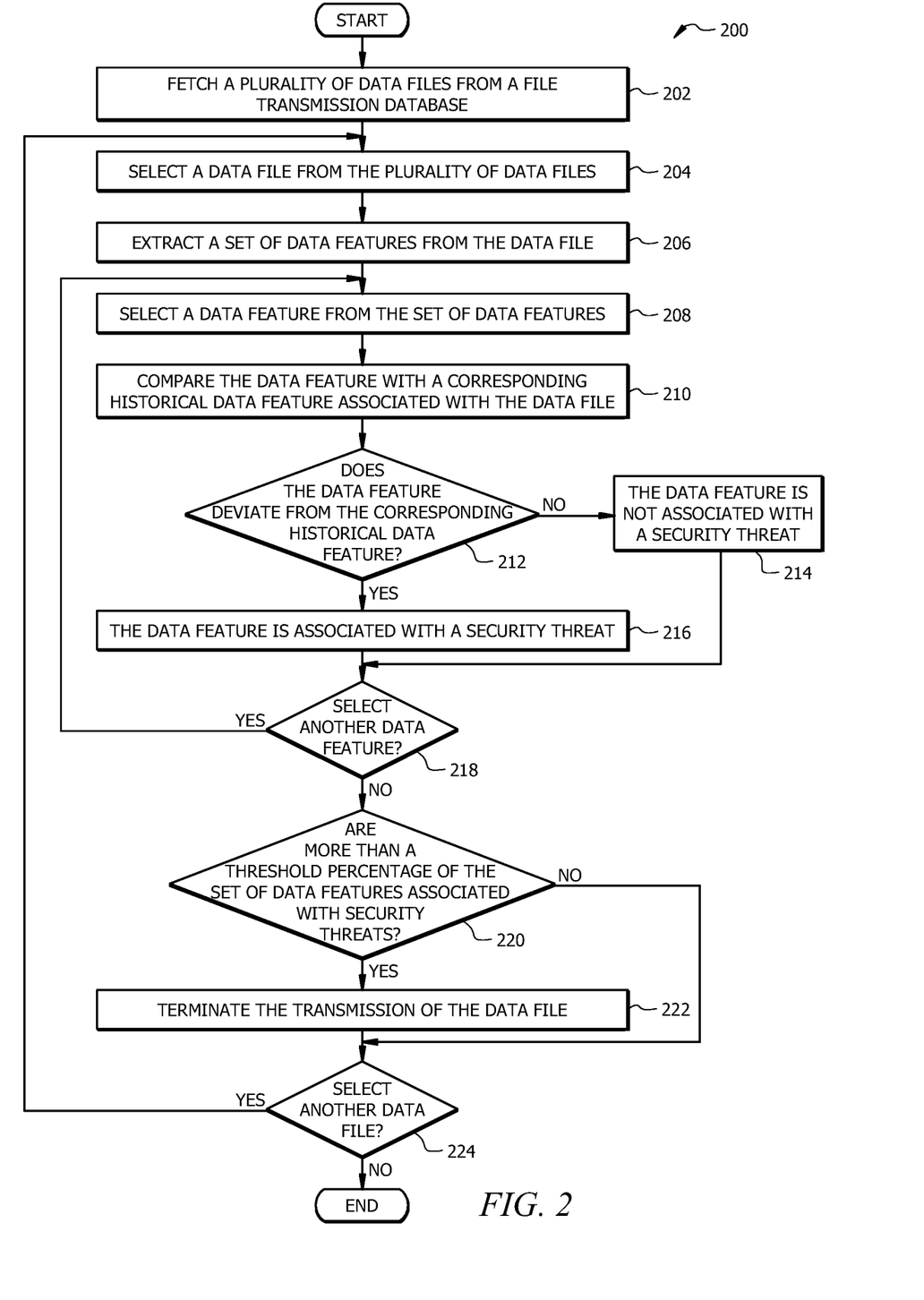
FIG. 2 illustrates an example flowchart of a method for detecting security threats in data transmission.

FIG. 2 illustrates an example flowchart of a method 200 for detecting security threats 168 in transmissions of data files 122. Modifications, additions, or omissions may be made to method 200. Method 200 may include more, fewer, or other steps. For example, steps may be performed in parallel or in any suitable order. While at times discussed as the system 100, processor 142, transmission analyzer 144, or components of any of thereof performing steps, any suitable system or components of the system may perform one or more steps of the method 200. For example, one or more steps of method 200 may be implemented, at least in part, in the form of software instructions 150 of FIG. 1, stored on non-transitory, tangible, machine-readable media (e.g., memory 148 of FIG. 1) that when run by one or more processors (e.g., processor 142 of FIG. 1) may cause the one or more processors to perform steps 202-224.

Method 200 begins at step 202 where the transmission analyzer 144 fetches a plurality of data files 122 from the file transmission database 120. For example, the transmission analyzer 144 may fetch the plurality of data files 122 from the file transmission database 120 periodically, e.g., every hour, every few hours, every day, or any suitable interval. The data files 122 may include any data that can be transmitted from a first computing device 130a to a second computing device 130b, such as a text, an email message, a report, etc.

At step 204, the transmission analyzer 144 selects a data file 122 from the plurality of data files 122. The transmission analyzer 144 may iteratively select a data file 122 from the plurality of data files 122 until no data file 122 is left for evaluation.

At step 206, the transmission analyzer 144 extracts a set of data features 162 from the data file 122. In this process, the transmission analyzer 144 may feed the data file 122 to the machine learning algorithm 152 to generate a vector representation 158 comprising numerical values representing the data features 162, similar to that described in FIG. 1. For example, the set of data features 162 may include the transmission timestamp 182, sender's credentials 184, receipt timestamp 186, receiver's credentials 188, security feature 194, among other data features 162.

At step 208, the transmission analyzer 144 selects a data feature 162 from the set of data features 162. In one embodiment, the transmission analyzer 144 may iteratively select a data feature 162 until no data feature 162 is left for evaluation.

At step 210, the transmission analyzer 144 compares the data feature 162 with a corresponding historical data feature 156 associated with the data file 122. In this process, the transmission analyzer 144 may compare a first numerical value from the first vector representation 158 representing the selected data feature 162 with a second numerical value from a second vector representation 158 representing the corresponding historical data feature 156 associated with the data file 122, similar to that described in FIG. 1.

At step 212, the transmission analyzer 144 determines whether the data feature 162 deviates from the corresponding historical data feature 156. For example, the transmission analyzer 144 may determine that the data feature 162 deviates from its corresponding historical data feature 156, if the first numerical value from the first vector representation 158 representing the data feature 162 is not within a threshold percentage 166 (e.g., 80%, 90%, etc.) of the second numerical value from the second vector representation 158 representing the corresponding historical data feature 156 associated with the data file 122, similar to that described in FIG. 1. If the transmission analyzer 144 determines that the data feature 162 deviates from its corresponding historical data feature 156, method 200 proceeds to step 216. Otherwise, method 200 proceeds to step 214.

At step 214, the transmission analyzer 144 determines that the data feature 162 is not associated with a security threat 168.

At step 216, the transmission analyzer 144 determines that the data feature 162 is associated with a security threat 168.

At step 218, the transmission analyzer 144 determines whether to select another data feature 162. The transmission analyzer 144 may select another data feature 162 if at least one data feature 162 from the set of data features 162 is left for evaluation. If the transmission analyzer 144 determines to select another data feature 162, method 200 returns to step 208. Otherwise, method 200 proceeds to step 220.

At step 220, the transmission analyzer 144 determines whether more than a threshold percentage 166 of the set of data features 162 are associated with security threats 168. If the transmission analyzer 144 determines that more than the threshold percentage 166 of the set of data features 162 are associated with security threats 168, method 200 proceeds to step 222. Otherwise, method 200 proceeds to step 224.

At step 222, the transmission analyzer 144 terminates the transmission of the data file 122. For example, assuming that the data file 122 is scheduled to be transmitted from the first computing device 130a to the second computing device 130b, the transmission analyzer 144 terminates the transmission channel 108 for transmitting the data file 122 from the first computing device 130a to the second computing device 130b.

In other embodiments, the transmission analyzer 144 may determine whether the detected security threats 168 are due to a server failure in a first server that is tasked to establish the transmission channel 108, similar to that described in FIG. 1. In response to determining that the detected security threats 168 are due to the server failure in the first server, the transmission analyzer 144 may establish a second communication channel 108 using a second server for transmitting the data file 122 from the first computing device 130a to the second computing device 130b.

At step 224, the transmission analyzer 144 determines whether to select another data file 122. The transmission analyzer 144 selects another data file 122 if at least one data file 122 is left for evaluation from the plurality of data files 122.

Example Method for Anomaly Detection in Data Transmission

Figure 3:
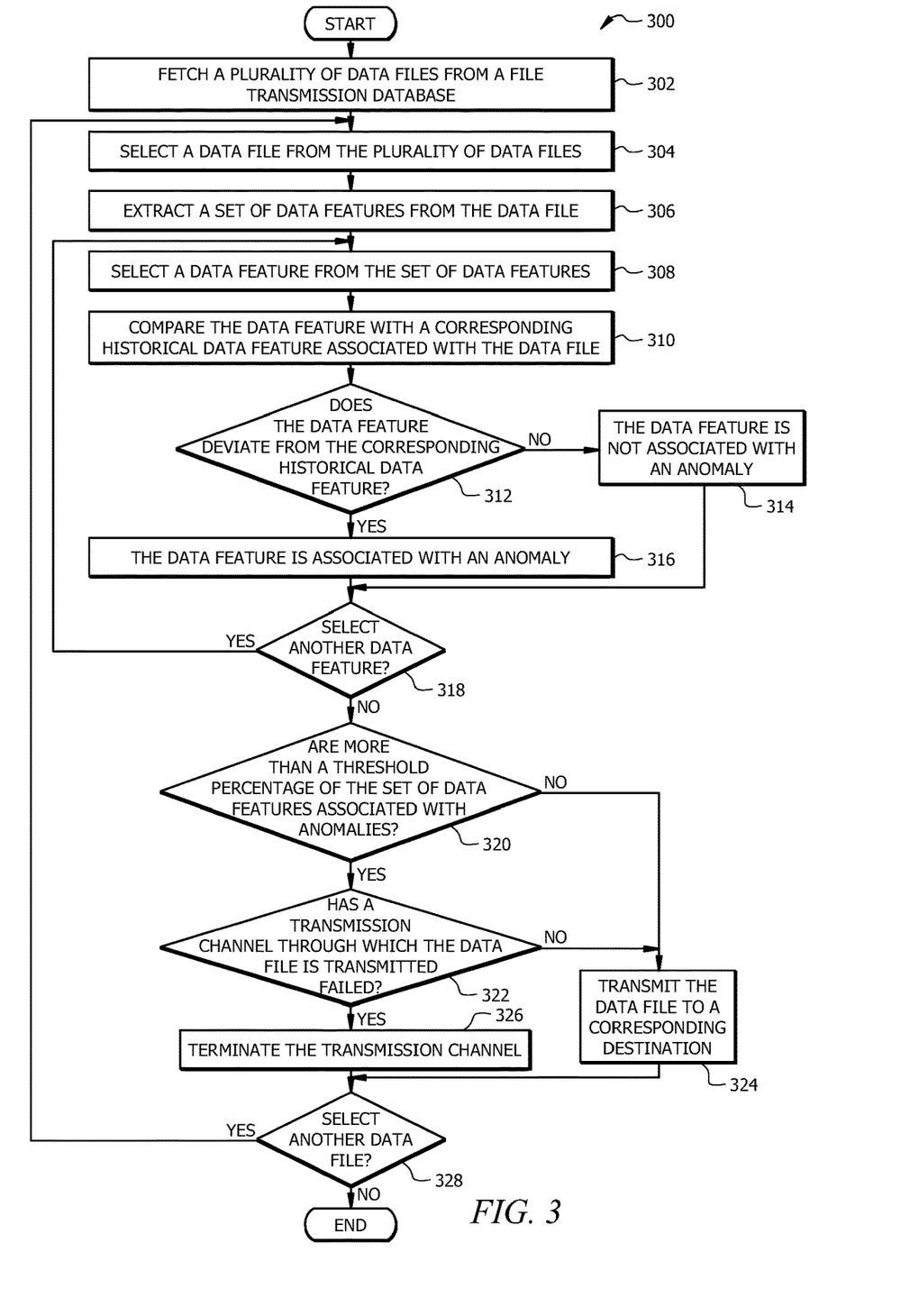
FIG. 3 illustrates an example flowchart of a method for detecting anomalies in data transmission.

FIG. 3 illustrates an example flowchart of a method 300 for detecting anomalies 160 in transmissions of data files 122. Modifications, additions, or omissions may be made to method 300. Method 300 may include more, fewer, or other steps. For example, steps may be performed in parallel or in any suitable order. While at times discussed as the system 100, processor 142, transmission analyzer 144, or components of any of thereof performing steps, any suitable system or components of the system may perform one or more steps of the method 300. For example, one or more steps of method 300 may be implemented, at least in part, in the form of software instructions 150 of FIG. 1, stored on non-transitory, tangible, machine-readable media (e.g., memory 148 of FIG. 1) that when run by one or more processors (e.g., processor 142 of FIG. 1) may cause the one or more processors to perform steps 302-328.

Method 300 begins at step 302 where the transmission analyzer 144 fetches a plurality of data files 122 from the file transmission database 120. For example, the transmission analyzer 144 may fetch the plurality of data files 122 from the file transmission database 120 periodically, e.g., every hour, every few hours, every day, or any suitable interval. The data files 122 may include any data that can be transmitted from a first computing device 130a to a second computing device 130b, such as a text, an email message, a report, etc.

At step 304, the transmission analyzer 144 selects a data file 122 from the plurality of data files 122. The transmission analyzer 144 may iteratively select a data file 122 from the plurality of data files 122 until no data file 122 is left for evaluation.

At step 306, the transmission analyzer 144 extracts a set of data features 162 from the data file 122. In this process, the transmission analyzer 144 may feed the data file 122 to the machine learning algorithm 152 to generate a vector representation 158 comprising numerical values representing the data features 162, similar to that described in FIG. 1. For example, the set of data features 162 may include the size 180 of the data file 122, acknowledgment indication 192, among other data features 162.

At step 308, the transmission analyzer 144 selects a data feature 162 from the set of data features 162. In one embodiment, the transmission analyzer 144 may iteratively select a data feature 162 until no data feature 162 is left for evaluation.

At step 310, the transmission analyzer 144 compares the data feature 162 with a corresponding historical data feature 156 associated with the data file 122. In this process, the transmission analyzer 144 may compare a first numerical value from the first vector representation 158 representing the selected data feature 162 with a second numerical value from a second vector representation 158 representing the corresponding historical data feature 156 associated with the data file 122, similar to that described in FIG. 1.

At step 312, the transmission analyzer 144 determines whether the data feature 162 deviates from the corresponding historical data feature 156. For example, the transmission analyzer 144 may determine that the data feature 162 deviates from its corresponding historical data feature 156, if the first numerical value from the first vector representation 158 representing the data feature 162 is not within a threshold percentage range (e.g., ±5%, ±10%, etc.) of the second numerical value from the second vector representation 158 representing the corresponding historical data feature 156 associated with the data file 122, similar to that described in FIG. 1. If the transmission analyzer 144 determines that the data feature 162 deviates from its corresponding historical data feature 156, method 300 proceeds to step 316. Otherwise, method 300 proceeds to step 314.

At step 314, the transmission analyzer 144 determines that the data feature 162 is not associated with an anomaly 160.

At step 316, the transmission analyzer 144 determines that the data feature 162 is associated with an anomaly 160.

At step 318, the transmission analyzer 144 determines whether to select another data feature 162. The transmission analyzer 144 may select another data feature 162 if at least one data feature 162 from the set of data features 162 is left for evaluation. If the transmission analyzer 144 determines to select another data feature 162, method 300 returns to step 308. Otherwise, method 300 proceeds to step 320.

At step 320, the transmission analyzer 144 determines whether more than a threshold percentage 166 of the set of data features 162 are associated with anomalies 160. If the transmission analyzer 144 determines that more than the threshold percentage 166 of the set of data features 162 are associated with anomalies 160, method 300 proceeds to step 322. Otherwise, method 300 proceeds to step 324.

At step 322, the transmission analyzer 144 determines whether a transmission channel 108 through which the data file 122 is being transmitted has failed. In this process, the transmission analyzer 144 determines whether a server that is tasked to establish the transmission channel 108 failed to establish the transmission channel 108. For example, in some cases, the transmission analyzer 144 may not receive the acknowledgment from the recipient 104 of the data file 122 that the data file 122 is received. Thus, in such cases, the acknowledgment indication 192 indicates that the acknowledgment is not received from the recipient 104 for the data file 122. In other examples, in some cases, the transmission analyzer 144 may determine that the data file 122 has a size 180 of zero or a size 180 that does not correspond to historical sizes 180 of the data file 122 in historical transmissions. Thus, in such cases, the transmission analyzer 144 may determine whether such anomalies 160 detected in size 180 and acknowledgment indication 192 are due to a failure in the transmission channel 108. If the transmission analyzer 144 determines that the transmission channel 108 has failed, method 300 proceeds to step 326. Otherwise, method 300 proceeds to step 324.

At step 324, the transmission analyzer 144 transmits the data file 122 to a corresponding destination. For example, assuming that the data file 122 is scheduled to be transmitted from the first computing device 130a to the second computing device 130b, the transmission analyzer 144 transmits the data file 122 to the second computing device 130b using the transmission channel 108.

At step 326, the transmission analyzer 144 terminates the transmission channel 108. For example, assuming that the data file 122 is scheduled to be transmitted from the first computing device 130a to the second computing device 130b, the transmission analyzer 144 terminates the transmission channel 108 for transmitting the data file 122 from the first computing device 130a to the second computing device 130b. In other embodiments, the transmission analyzer 144 may determine whether the detected anomalies 160 are due to a server failure in a first server that is tasked to establish the transmission channel 108, and in response, establish a second transmission channel 108 for transmitting the data file 122 using a second server, similar to that described in FIG. 1.

At step 328, the transmission analyzer 144 determines whether to select another data file 122. The transmission analyzer 144 selects another data file 122 if at least one data file 122 is left for evaluation from the plurality of data files 122. If the transmission analyzer 144 determines to select another data file 122, method 300 returns to step 304. Otherwise, method 300 terminates.

Example Method for Incompliance Detection in Data Transmission

Figure 4:
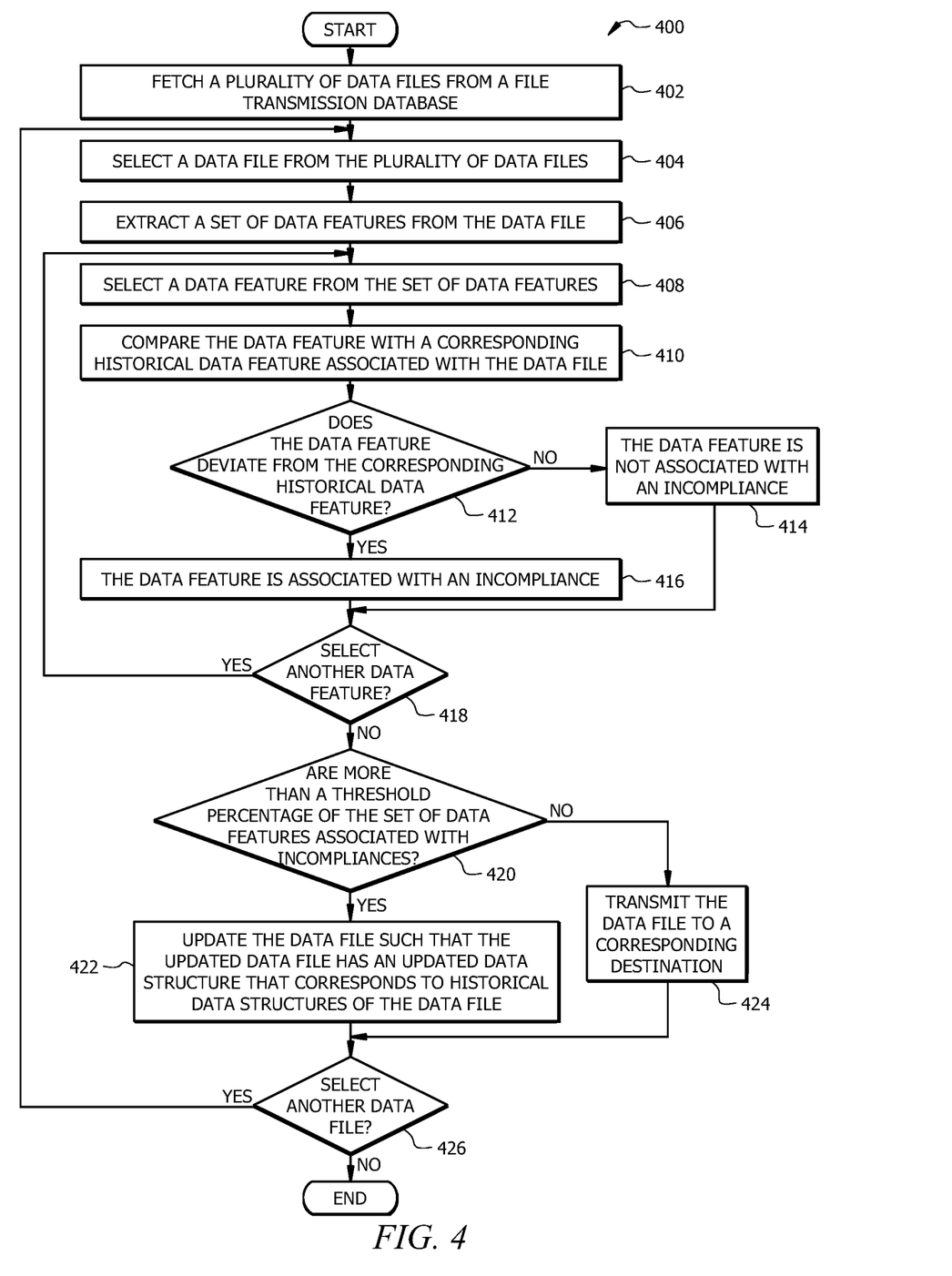
FIG. 4 illustrates an example flowchart of a method for detecting incompliances in data transmission.

FIG. 4 illustrates an example flowchart of a method 400 for detecting incompliances 170 in transmissions of data files 122. Modifications, additions, or omissions may be made to method 400. Method 400 may include more, fewer, or other steps. For example, steps may be performed in parallel or in any suitable order. While at times discussed as the system 100, processor 142, transmission analyzer 144, or components of any of thereof performing steps, any suitable system or components of the system may perform one or more steps of the method 400. For example, one or more steps of method 400 may be implemented, at least in part, in the form of software instructions 150 of FIG. 1, stored on non-transitory, tangible, machine-readable media (e.g., memory 148 of FIG. 1) that when run by one or more processors (e.g., processor 142 of FIG. 1) may cause the one or more processors to perform steps 402-426.

Method 400 begins at step 402 where the transmission analyzer 144 fetches a plurality of data files 122 from the file transmission database 120. For example, the transmission analyzer 144 may fetch the plurality of data files 122 from the file transmission database 120 periodically, e.g., every hour, every few hours, every day, or any suitable interval. The data files 122 may include any data that can be transmitted from a first computing device 130*a* to a second computing device 130*b*, such as a text, an email message, a report, etc.

At step 404, the transmission analyzer 144 selects a data file 122 from the plurality of data files 122. The transmission analyzer 144 may iteratively select a data file 122 from the plurality of data files 122 until no data file 122 is left for evaluation.

At step 406, the transmission analyzer 144 extracts a set of data features 162 from the data file 122. In this process, the transmission analyzer 144 may feed the data file 122 to the machine learning algorithm 152 to generate a vector representation 158 comprising numerical values representing the data features 162, similar to that described in FIG. 1. For example, the set of data features 162 may include the data structure 190 of the data file 122 among other data features 162.

At step 408, the transmission analyzer 144 selects a data feature 162 from the set of data features 162. In one embodiment, the transmission analyzer 144 may iteratively select a data feature 162 until no data feature 162 is left for evaluation.

At step 410, the transmission analyzer 144 compares the data feature 162 with a corresponding historical data feature 156 associated with the data file 122. In this process, the transmission analyzer 144 may compare a first numerical value from the first vector representation 158 representing the selected data feature 162 with a second numerical value from a second vector representation 158 representing the corresponding historical data feature 156 associated with the data file 122, similar to that described in FIG. 1.

At step 412, the transmission analyzer 144 determines whether the data feature 162 deviates from the corresponding historical data feature 156. For example, the transmission analyzer 144 may determine that the data feature 162 deviates from its corresponding historical data feature 156, if the first numerical value from the first vector representation 158 representing the data feature 162 is not within a threshold percentage range (e.g., ±5%, ±10%, etc.) of the second numerical value from the second vector representation 158 representing the corresponding historical data feature 156 associated with the data file 122, similar to that described in FIG. 1. If the transmission analyzer 144 determines that the data feature 162 deviates from its corresponding historical data feature 156, method 400 proceeds to step 416. Otherwise, method 400 proceeds to step 414.

At step 414, the transmission analyzer 144 determines that the data feature 162 is not associated with an incompliance 170. For example, if the current data structure 190 of the data file 122 corresponds to historical data structures 190 of the data file 122 indicated in the historical features 156, the transmission analyzer 144 determines that the current data structure 190 of the data file 122 complies with the historical data structures 190 of the data file 122, i.e., the data structure 190 is not associated with an incompliance 170.

At step 416, the transmission analyzer 144 determines that the data feature 162 is associated with an incompliance 170. For example, if the current data structure 190 of the data file 122 does not correspond to historical data structures 190 of the data file 122 indicated in the historical features 156, the transmission analyzer 144 determines that the current data structure 190 of the data file 122 does not comply with the historical data structures 190 of the data file 122, i.e., the data structure 190 is associated with an incompliance 170.

At step 418, the transmission analyzer 144 determines whether to select another data feature 162. The transmission analyzer 144 may select another data feature 162 if at least one data feature 162 from the set of data features 162 is left for evaluation. If the transmission analyzer 144 determines to select another data feature 162, method 400 returns to step 408. Otherwise, method 400 proceeds to step 420.

At step 420, the transmission analyzer 144 determines whether more than a threshold percentage 166 of the set of data features 162 are associated with incompliances 170. If the transmission analyzer 144 determines that more than the threshold percentage 166 of the set of data features 162 are associated with incompliances 170, method 400 proceeds to step 422. Otherwise, method 400 proceeds to step 424.

At step 422, the transmission analyzer 144 updates the data file 122 such that the updated data file 122 has an updated data structure 190 that corresponds to historical data structures 190 of the data file 122 indicated in the historical data features 156, similar to that described in FIG. 1.

In other embodiments, the transmission analyzer 144 may determine whether the detected incompliances 170 are due to a server failure in a first server that is tasked to establish the transmission channel 108, and in response, establish a second transmission channel 108 for transmitting the data file 122 using a second server, similar to that described in FIG. 1.

At step 424, the transmission analyzer 144 transmits the data file 122 to a corresponding destination. For example, assuming that the data file 122 is scheduled to be transmitted from the first computing device 130*a* to the second computing device 130*b*, the transmission analyzer 144 transmits the data file 122 to the second computing device 130*b* using the transmission channel 108.

At step 426, the transmission analyzer 144 determines whether to select another data file 122. The transmission analyzer 144 selects another data file 122 if at least one data file 122 is left for evaluation from the plurality of data files 122. If the transmission analyzer 144 determines to select another data file 122, method 400 returns to step 404. Otherwise, method 400 terminates.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A method for anomaly detection in data transmission, comprising:
    fetching a plurality of data files from a memory, wherein the plurality of data files is scheduled to be communicated between a first computing device and a second computing device;
    for each data file from the plurality of data files:
        extracting a set of data features from the data file, the set of data features comprising at least one of a size of the data file and an acknowledgment of a receipt of the data file;
        for at least one data feature from the set of data features:
            comparing the data feature with a corresponding historical data feature from a set of historical data features associated with the data file, wherein the set of historical data features corresponds to data features associated with the data file historically communicated between the first computing device and the second computing device; and
            determining whether the data feature deviates from the corresponding historical data feature;
            in response to determining that the data feature deviates from the corresponding historical data feature, determining that the data feature is associated with an anomaly indicating that a transmission of the data file is not processed, wherein determining that the data feature is associated with the anomaly comprises at least one of:
                determining that the size of the data file is not within a threshold range of a historical size of the data file indicated in the set of historical data files; and
                determining that the acknowledgment of the receipt of the data file is not received;
        determining whether more than a threshold percentage of the set of data features are associated with anomalies; and
        in response to determining that more than the threshold percentage of the set of data features are associated with the anomalies, determining whether the anomalies are due to a failure in a transmission channel through which the data file is transmitted from the first computing device to the second computing device;
        in response to determining that the anomalies are due to the failure in the transmission channel, terminating the transmission channel.

2. The method of claim 1, wherein determining whether the transmission channel has failed comprises determining whether a first server that is tasked to establish the transmission channel failed to establish the transmission channel.

3. The method of claim 2, further comprising, in response to determining that the first server has failed to establish the transmission channel, transmitting the data file from the first computing device to the second computing device by using a second server.

4. The method of claim 1, further comprising, in response to determining that more than the threshold percentage of the set of data features are associated with the anomalies, sending a notification to address the anomalies by updating the data file, such that the size of the updated data file is within the threshold range of the historical size of the data file.

5. The method of claim 1, wherein comparing the data feature with the corresponding historical data feature from the set of historical data features, comprises:
    determining a first numerical value representing the data feature;
    determining a second numerical value representing the corresponding historical data feature;
    comparing the first numerical value with the second numerical value;
    determining whether the first numerical value is within a threshold percentage range of the second numerical value; and
    in response to determining that the first numerical value is not within the threshold percentage range of the second numerical value, determining that the data feature deviates from the corresponding historical data feature.

6. The method of claim 5, wherein comparing the data feature with the corresponding historical data feature from the set of historical data features further comprises, in response to determining that the first numerical value is within the threshold percentage range of the second numerical value, determining that the data feature does not deviate from the corresponding historical data feature.

7. The method of claim 1, further comprising, in response to determining that more than the threshold percentage of the set of data features are associated with the anomalies, assigning a high priority for inspecting the data file before other data files from the plurality of data files.

8. A non-transitory computer-readable medium storing executable instructions that when executed by a processor causes the processor to:
    fetch a plurality of data files from a memory, wherein the plurality of data files is scheduled to be communicated between a first computing device and a second computing device;
    for each data file from the plurality of data files:
        extract a set of data features from the data file, the set of data features comprising at least one of a size of the data file and an acknowledgment of a receipt of the data file;
        for at least one data feature from the set of data features:
            compare the data feature with a corresponding historical data feature from a set of historical data features associated with the data file, wherein the set of historical data features corresponds to data features associated with the data file historically communicated between the first computing device and the second computing device; and determine whether the data feature deviates from the corresponding historical data feature;

in response to determining that the data feature deviates from the corresponding historical data feature, determine that the data feature is associated with an anomaly indicating that a transmission of the data file is not processed, wherein determining that the data feature is associated with the anomaly comprises at least one of:

determining that the size of the data file is not within a threshold range of a historical size of the data file indicated in the set of historical data files; and determining that the acknowledgment of the receipt of the data file is not received;

determine whether more than a threshold percentage of the set of data features are associated with anomalies; and in response to determining that more than the threshold percentage of the set of data features are associated with the anomalies, determine whether the anomalies are due to a failure in a transmission channel through which the data file is transmitted from the first computing device to the second computing device;

in response to determining that the anomalies are due to the failure in the transmission channel, terminate the transmission channel.

9. The non-transitory computer-readable medium of claim 8, wherein determining whether the transmission channel has failed comprises determining whether a first server that is tasked to establish the transmission channel failed to establish the transmission channel.

10. The non-transitory computer-readable medium of claim 9, wherein the instructions when executed by the processor, further cause the processor to, in response to determining that the first server has failed to establish the transmission channel, transmit the data file from the first computing device to the second computing device by using a second server.

11. The non-transitory computer-readable medium of claim 8, wherein the instructions when executed by the processor, further cause the processor to, in response to determining that more than the threshold percentage of the set of data features are associated with the anomalies, send a notification to address the anomalies by updating the data file, such that the size of the updated data file is within the threshold range of the historical size of the data file.

12. The non-transitory computer-readable medium of claim 8, wherein comparing the data feature with the corresponding historical data feature from the set of historical data features, comprises:

determining a first numerical value representing the data feature;

determining a second numerical value representing the corresponding historical data feature;

comparing the first numerical value with the second numerical value;

determining whether the first numerical value is within a threshold percentage range of the second numerical value; and in response to determining that the first numerical value is not within the threshold percentage range of the second numerical value, determining that the data feature deviates from the corresponding historical data feature.

13. The non-transitory computer-readable medium of claim 12, wherein comparing the data feature with the corresponding historical data feature from the set of historical data features further comprises, in response to determining that the first numerical value is within the threshold percentage range of the second numerical value, determining that the data feature does not deviate from the corresponding historical data feature.

14. A system for anomaly detection in data transmission, comprising:

a memory operable to store a plurality of data files being communicated between a first computing device and a second computing device, and a processor, operably coupled with the memory, and configured to:

fetch the plurality of data files from the memory;

for each data file from the plurality of data files:

extract a set of data features from the data file, the set of data features comprising at least one of a size of the data file and an acknowledgment of a receipt of the data file;

for at least one data feature from the set of data features:

compare the data feature with a corresponding historical data feature from a set of historical data features associated with the data file, wherein the set of historical data features corresponds to data features associated with the data file historically communicated between the first computing device and the second computing device; and determine whether the data feature deviates from the corresponding historical data feature;

in response to determining that the data feature deviates from the corresponding historical data feature, determine that the data feature is associated with an anomaly indicating that a transmission of the data file is not processed, wherein determining that the data feature is associated with the anomaly comprises at least one of:

determining that the size of the data file is not within a threshold range of a historical size of the data file indicated in the set of historical data files; and determining that the acknowledgment of the receipt of the data file is not received;

determine whether more than a threshold percentage of the set of data features are associated with anomalies; and in response to determining that more than the threshold percentage of the set of data features are associated with the anomalies, determine whether the anomalies are due to a failure in a transmission channel through which the data file is transmitted from the first computing device to the second computing device;

in response to determining that the anomalies are due to the failure in the transmission channel, terminate the transmission channel.

15. The system of claim 14, wherein determining whether the transmission channel has failed comprises determining whether a first server that is tasked to establish the transmission channel failed to establish the transmission channel.

16. The system of claim 15, wherein the processor is further configured to, in response to determining that the first server has failed to establish the transmission channel, transmit the data file from the first computing device to the second computing device by using a second server.

17. The system of claim 14, wherein the processor is further configured to, in response to determining that more than the threshold percentage of the set of data features are associated with the anomalies, send a notification to address the anomalies by updating the data file, such that the size of the updated data file is within the threshold range of the historical size of the data file.

18. The system of claim 14, wherein comparing the data feature with the corresponding historical data feature from the set of historical data features, comprises:
   determining a first numerical value representing the data feature;
   determining a second numerical value representing the corresponding historical data feature;
   comparing the first numerical value with the second numerical value;
   determining whether the first numerical value is within a threshold percentage range of the second numerical value; and
   in response to determining that the first numerical value is not within the threshold percentage range of the second numerical value, determining that the data feature deviates from the corresponding historical data feature.

19. The system of claim 18, wherein comparing the data feature with the corresponding historical data feature from the set of historical data features further comprises, in response to determining that the first numerical value is within the threshold percentage range of the second numerical value, determining that the data feature does not deviate from the corresponding historical data feature.

20. The system of claim 14, wherein the processor is further configured to, in response to determining that more than the threshold percentage of the set of data features are associated with the anomalies, assign a high priority for inspecting the data file before other data files from the plurality of data files.

* * * * *